United States Patent
Huber et al.

(10) Patent No.: US 8,979,450 B2
(45) Date of Patent: Mar. 17, 2015

(54) FUNCTION ELEMENT, METHOD FOR PRODUCING A FUNCTION ELEMENT

(75) Inventors: Thomas Huber, Schliersee (DE); Richard Holzner, Stephanskirchen (DE)

(73) Assignee: Telair International GmbH (DE)

( * ) Notice: Subject to any disclaimer, the term of this patent is extended or adjusted under 35 U.S.C. 154(b) by 266 days.

(21) Appl. No.: 13/379,963

(22) PCT Filed: Jun. 22, 2009

(86) PCT No.: PCT/EP2009/004483
§ 371 (c)(1),
(2), (4) Date: Feb. 1, 2012

(87) PCT Pub. No.: WO2010/149178
PCT Pub. Date: Dec. 29, 2010

(65) Prior Publication Data
US 2012/0119052 A1 May 17, 2012

(51) Int. Cl.
*B60P 7/08* (2006.01)
*B64D 9/00* (2006.01)
*B64D 11/06* (2006.01)

(52) U.S. Cl.
CPC ............ *B64D 9/003* (2013.01); *B64D 11/0696* (2013.01); *Y10T 29/49826* (2015.01)
USPC ........... 410/105; 410/102; 410/104; 248/429; 248/500

(58) Field of Classification Search
CPC .............. B64D 11/0696; B64D 9/003; B64D 11/0699; B60P 7/0815; F16B 21/10
USPC ................ 248/429, 500, 503.1, 118.1, 188.6; 439/157
See application file for complete search history.

(56) References Cited

U.S. PATENT DOCUMENTS

| | | | |
|---|---|---|---|
| 3,241,501 A * | 3/1966 | Watts | 410/105 |
| 3,262,588 A | 7/1966 | Davidson | |
| 4,493,470 A * | 1/1985 | Engel | 248/503.1 |
| 5,131,606 A | 7/1992 | Nordstrom | |
| 5,169,091 A | 12/1992 | Beroth | |
| 5,871,318 A * | 2/1999 | Dixon et al. | 410/105 |
| 6,902,365 B1 * | 6/2005 | Dowty | 410/105 |
| 7,607,613 B2 * | 10/2009 | Frantz et al. | 244/118.6 |
| 8,602,702 B2 * | 12/2013 | Roy et al. | 410/105 |
| 2007/0232101 A1 | 10/2007 | Hudson | |
| 2011/0013972 A1 * | 1/2011 | Roy et al. | 403/109.1 |

FOREIGN PATENT DOCUMENTS

GB   2411429   8/2005

OTHER PUBLICATIONS

International Search Report for International Application No. PCT/EP2009/004483 dated Apr. 21, 2010.

* cited by examiner

*Primary Examiner* — Amy J. Sterling
(74) *Attorney, Agent, or Firm* — Barnes & Thornburg LLP

(57) ABSTRACT

Some embodiments of the invention relate to function elements for fixing in seat rails of aircraft. The function element according to the invention may include: a fixing rail with a web running in the x direction and a multiplicity of extensions which protrude beyond the web in a y direction to form a T profile, wherein the fixing rail is formed corresponding to the seat rail such that the fixing rail can be inserted in the seat rail and moved along the x direction into a holding position in which the extensions sit between the holes below the slots, at least one fixing peg which is arranged mobile on the fixing rail and can be brought into a blocking position in which the fixing peg engages in a hole of the seat rail so that the function element is fixed in the x direction.

8 Claims, 4 Drawing Sheets

FUNCTION ELEMENT, METHOD FOR PRODUCING A FUNCTION ELEMENT

CROSS-REFERENCE TO RELATED APPLICATIONS

This application claims priority to, and is a National Phase application of, pending PCT/EP2009/004483 entitled, Function Element, Method for Producing a Function Element, filed Jun. 22, 2009, the disclosure of which is hereby incorporated by reference in its entirety.

FIELD OF THE INVENTION

The invention concerns a function element and a method for production of a function element.

BACKGROUND OF THE INVENTION

It is known that loading areas e.g. cargo bays or passenger areas of aircrafts must frequently be converted for different uses. For example depending on the use of the aircraft it may be necessary for seats for passengers to be fitted in the aircraft cargo bay. In another application for example the passenger space may be needed exclusively to contain freight. Some aircraft, in particular military aircraft, have only one loading area which can be used for loading passengers and/or freight. For optimum use of the aircraft loading areas, seat rails are mounted which allow the seats to be installed quickly and easily and to change their position. It is known to use these seat rails also as an anchoring base for locking elements or other function elements (e.g. roller elements, fixing eyes etc.). The function elements used have suitable fixing mechanisms for anchoring in the seat rails.

The fixing mechanism provided must be robust and suitable for transferring heavy loads to the aircraft floor. Fitting the function element must be quick and easy.

Corresponding function elements which can be attached to a seat rail or perforated rail are known from U.S. Pat. No. 3,262,588. Amongst others a roller element is described which can be mounted in a seat rail. For fixing, several mushroom-shaped elements are installed via holes in the seat rails and the function element is moved such that the mushroom-shaped elements come to lie in a position between two adjacent holes in which removal of the function direction in the z direction is not possible since this is held by extensions of the elements between the holes. To fix the function element in this holding position, fixing pegs are provided which can be lowered parallel to the mushroom-shaped elements and engage in a hole in the seat rail. As soon as the fixing pegs are lowered, the function element can no longer be moved in the x direction. Because of the mushroom-shaped elements and fixing pegs, the function element is held in the seat rail.

Mounting of the function elements described in U.S. Pat. No. 3,262,588 often proves complex as it is difficult to install the mushroom-shaped elements in the individual holes of the seat rails. Also on removal of the function element, frequently the fixing mechanism seizes so that here increased care must be applied. Furthermore the function element described has numerous mechanical components which, under the careless handling normally applied in the loading area, must often be replaced. Sometimes whole function elements must be changed as the associated fixing mechanism is faulty. Also production of the fixing mechanism is complex and costly.

Some embodiments of the invention, provide a function element for fixing in a seat rail which is robust, easy to install and manufacture, and guarantees secure anchoring of the function element in the seat rail. Furthermore a corresponding method is provided for production of the function element.

SUMMARY OF THE INVENTION

According to an embodiment, a function element for fixing in a seat rail of an aircraft, wherein the seat rail has a multiplicity of holes which are connected together in the x direction by slots and arranged in a grid pattern, including: a fixing rail with a web running in the x direction and a multiplicity of extensions which protrude beyond the web in a y direction to form a T profile, wherein the fixing rail is formed corresponding to the seat rail such that the fixing rail can be inserted in the seat rail and moved in the x direction to a holding position in which the extensions sit between the holes below the slots, at least one fixing peg which is arranged mobile on the fixing rail (30) and which can be brought into a blocking position in which the fixing peg engages in a hole of the seat rail such that the fixing element is fixed in the x direction.

Thus a function element is provided for fixing in a seat rail. Theoretically it is also possible to design the function element according to the invention for fixing in any perforated rail comprising a multiplicity of holes, preferably connected together in the x direction by slots. Preferably the holes are arranged in a grid pattern. It would however also be possible to apply the teaching of the invention to perforated rails with holes at irregular intervals. The claims refer to x, y and z directions. Preferably these directions are vectors from the Cartesian coordinate system wherein the x direction corresponds to the longitudinal direction of the seat rail and/or the fixing rail. The holes in the seat rail preferably lie in the x-y plane which is spanned vertical to the z plane.

An essential concept of the present application is to structure the fixing mechanism of the function element as a fixing rail. This comprises a web and a multiplicity of extensions which can be inserted in the rail. In the inserted state the fixing rail can be moved within the seat rail along the x direction. Because of the linear and/or one-piece design of the fixing rail, no seizing of the function element within the rail can occur. The fixing rail serves as a guide. Furthermore a multiplicity of extensions can be arranged on the fixing rail which guarantee secure and distributed transfer of applied forces into the seat rail. In the holding position preferably, each of the extensions which extend on alternate sides over the web, sits between a pair of adjacent holes in the seat rail below a slot. Forces acting in the z direction are transferred directly to the seat rail via these extensions. Further forces acting in directions transverse to the longitudinal direction (x direction) of the fixing rail are also absorbed by the seat rail. The engaged fixing peg thus secures the function element against displacement in the x direction and at least partly absorbs correspondingly directed forces.

The fixing rail should have at least two extensions and at least one fixing peg should be arranged between the extensions. Thus it can be ensured that all forces occurring can be transferred securely to the seat rail or rails.

The fixing peg can be arranged offset to the extensions in the x direction by half a grid interval. Theoretically it is possible, after inserting the fixing rail in the seat rail, to slide these only slightly against each other to assume the holding position. Preferably the rails are offset to each other by half a grid interval so that an optimum force fit can be achieved. To fix the fixing rail securely in the seat rail, the fixing peg should be shifted by half a grid interval in relation to the extensions. Thus after corresponding shifting of the fixing rail in relation to the seat rail, the fixing peg can engage in a corresponding hole in the seat rail.

The fixing peg can be formed as a threaded bolt. It is conceivable to move the fixing peg to and fro between the blocking position and a release position by means of spring elements and provide further means for the blocking position to secure the fixing pegs there. Preferably the fixing peg is a threaded bolt which is arranged in a corresponding bore on or in the function element and can be screwed in and out to assume the different positions.

The function element can be formed as an extruded profile from which the extensions are moulded separately, in particular from one piece, along a base of the function element. The compact design of the fixing rail, in particular with the corresponding T profile, allows the function element to be produced partly or fully in an extrusion moulding process. The extensions can be moulded out of the T profile separately, for example by milling.

The web can be interrupted at least in sections to form a recess for the fixing peg in the blocking position.

Preferably the web together with the fixing peg is formed of one piece and extends along a base of the function element. Preferably the fixing peg in this arrangement is integrated such that it is partly covered by the web. Thus the web serves as a guide and protection for the fixing peg. In a further embodiment the side walls of the recess can comprise a threaded structure to allow the fixing peg to be screwed in and out.

Theoretically it is possible to use the function element according to the invention for fixing seats, roller elements, ball elements etc. Preferably the function element is a locking element which can be used for example for fixing containers.

According to an embodiment of the invention an arrangement is also claimed comprising at least one seat rail and at least one function element as described above.

For the method the object described initially is achieved preferably by a method for producing a function element for an aircraft wherein the function element comprises fixing rails for fixing the function element in a seat rail which has a multiplicity of holes connected by slots, wherein the method includes: extrusion moulding of a profile, in particular an I profile, which extends in the x direction and in which a first and second flange are connected by a web extending in the z direction, creation of recesses from the second flange to form extensions spaced in a grid pattern which protrude beyond the web in a y direction, wherein the web and the extensions are formed such that these can be inserted in the perforated rails and moved into a holding position in which the extensions sit between the holes below the slots, production of at least one bore in the z direction which at least partly interrupts the web or runs parallel to this, insertion of at least one fixing peg in the bore such that this can be moved to and fro within the bore between a blocking position and a release position, wherein the fixing peg at least in sections has a diameter which is greater than a wall thickness of the web and in the blocking position engages in a hole in the perforated rail in order to fix the function element in the holding position in the x direction.

The advantages described in connection with the device also apply to the method. To save costs in production, the function element according to the invention can be produced in the extrusion moulding method wherein individual important elements are formed subsequently by material removal or milling. Following the extrusion moulding, the extensions can thus be milled or cut out in an extremely efficient manner and a corresponding bore provided for the fixing peg.

In one embodiment the extensions, at least along the y direction, have a diameter which substantially corresponds to the diameter of the bore.

The bore should be arranged centrally to the web. The bore should be made such that the centre of the bore lies on a plane of symmetry extending in the x direction of the web. Where a profile or I profile is produced in the extrusion moulding method, the second flange—preferably after further processing steps—can be converted into the extensions while the first flange forms a base of the function element. This base can serve to hold further functional elements of the function element. For example a locking claw can be anchored to this base.

Further advantageous embodiments arise from the dependent claims.

BRIEF DESCRIPTION OF THE DRAWINGS

Embodiments of the invention is described below using some embodiment examples which are explained with reference to figures. These show.

DETAILED DESCRIPTION

Figure 1:
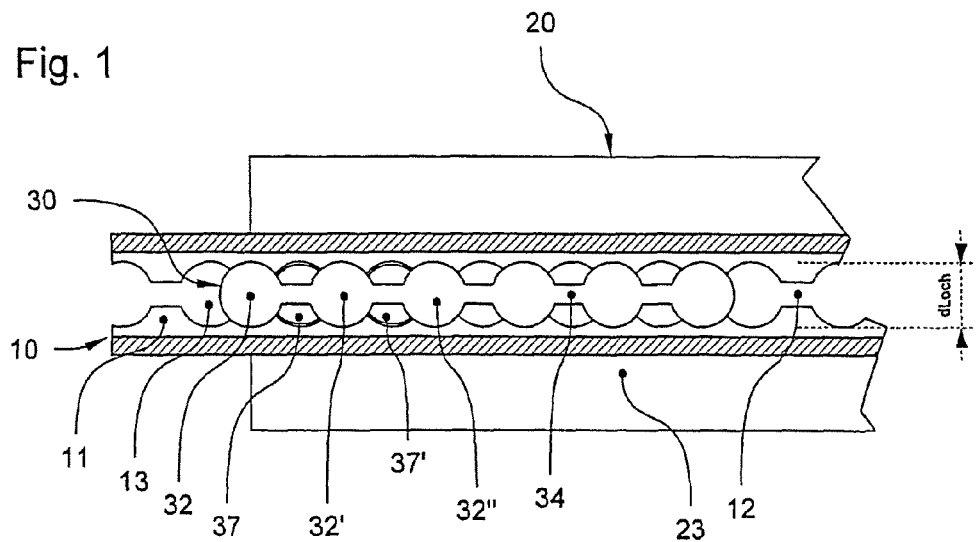
FIG. 1 a longitudinal section through a seat rail in which a locking element according to the invention is inserted.

In the description below the same reference numerals are used for the same parts and those with the same effect.

Figure 7:
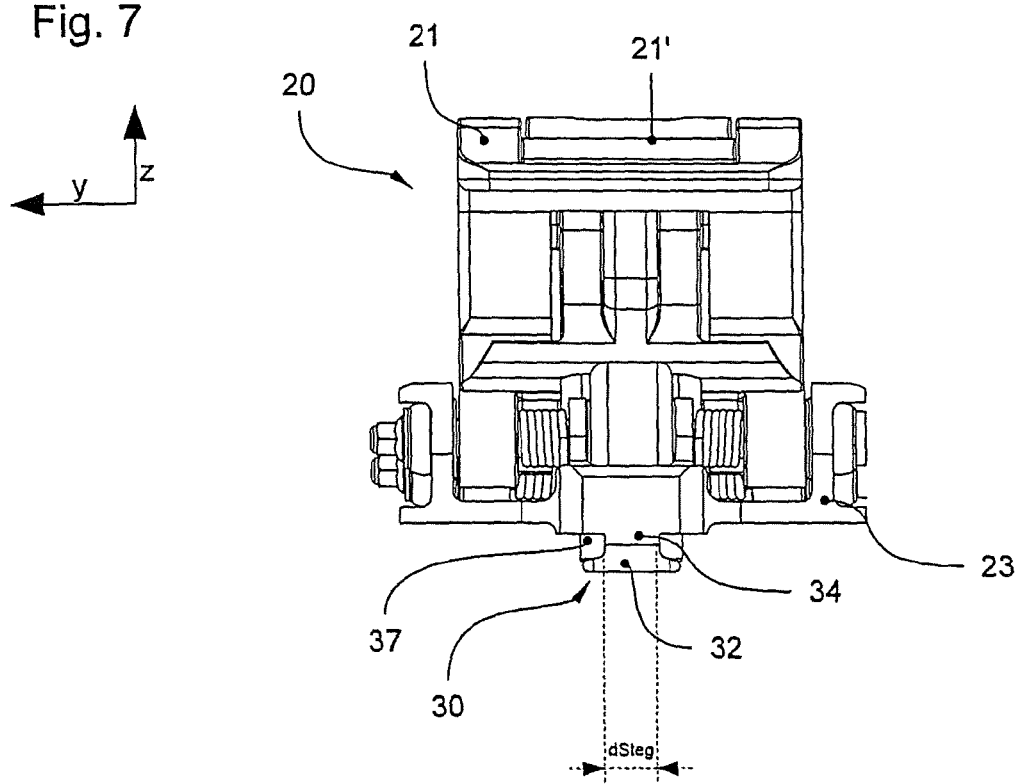
FIG. 7 a front view of the locking element in FIG. 1.

FIG. 1 shows a function element according to the invention, namely a locking element 20, in bottom view. The locking element 20 comprises a fixing rail 30 which extends along a lock base 23 of the locking element 20 in the x direction. The fixing rail has a web 34 and a multiplicity of extensions 32, 32' and 32". As shown in FIG. 7, the fixing rail 30 has a T profile in cross section wherein the web 34 in a front view extends along a z direction and is terminated by extensions 32, 32', 32", in particular by extension 32. Extensions 32 to 32' thus protrude beyond the web 34 on both sides of the web 34 in the y direction.

Figure 5:
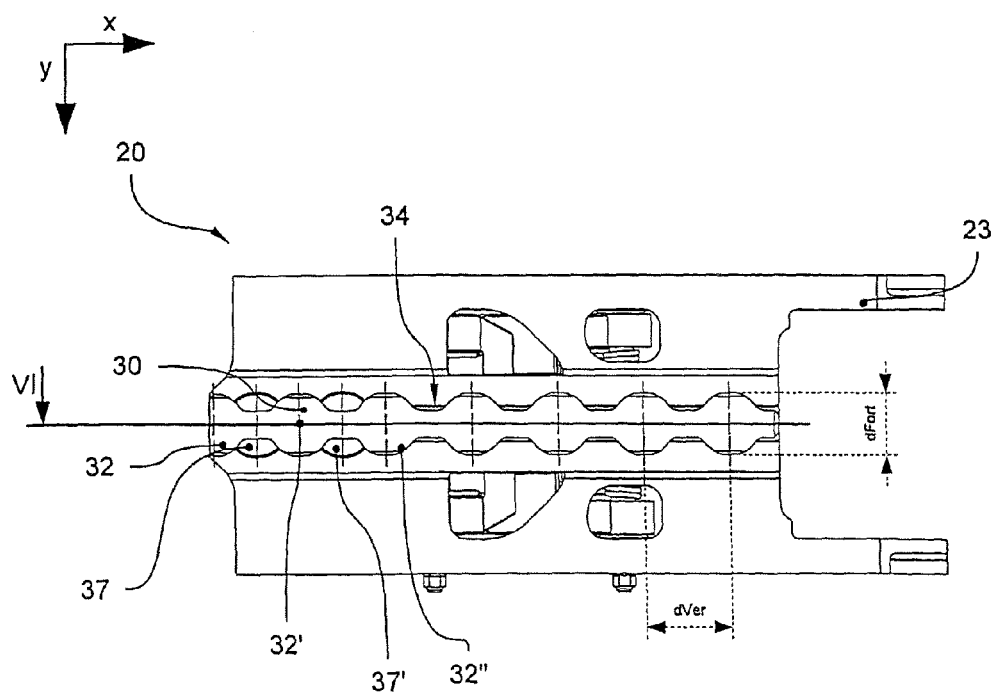
FIG. 5 a bottom view of the locking element in FIG. 1.

As evident from FIG. 1, extensions 32 to 32" in the x-y plane have a substantially circular form and are spaced at regular intervals from each other. Extensions 32 to 32" are arranged in a regular grid pattern. Preferably extensions 32 to 32" are each offset to their neighbour by approximately 2.54 cm (1 inch) in the x direction. They thus, as shown in FIG. 5, have a extension offset $d_{Ver}$ of approximately 2.54 cm.

Thus the fixing rail 30 is formed corresponding to a perforated rail 10 which comprises a multiplicity of perforated rail recesses 13 connected together by slots 12. In one embodiment example the perforated rail recesses 13 are holes which have a diameter $d_{Loch}$ (see FIG. 1) of approximately 2 cm. The perforated rail recesses 13 are arranged in a grid pattern with a hole offset of approximately 2.54 cm (1 inch). The hole offset thus corresponds substantially to the extension offset $d_{Ver}$.

FIG. 1 shows the locking element 20 in a holding position in perforated rail 10. To assume this position, the fixing rail 30 with extensions 32 to 32' was inserted in the perforated rail recesses 13 and moved in the x direction by approximately 1.27 cm (½ inch). In the holding position, extensions 32 to 32' coincide with protrusions 11 in the perforated rail 10. Extensions 32 to 32″ are thus anchored in the slots 12 and can transfer forces transverse to the x direction into the perforated rail 10.

Figure 2:
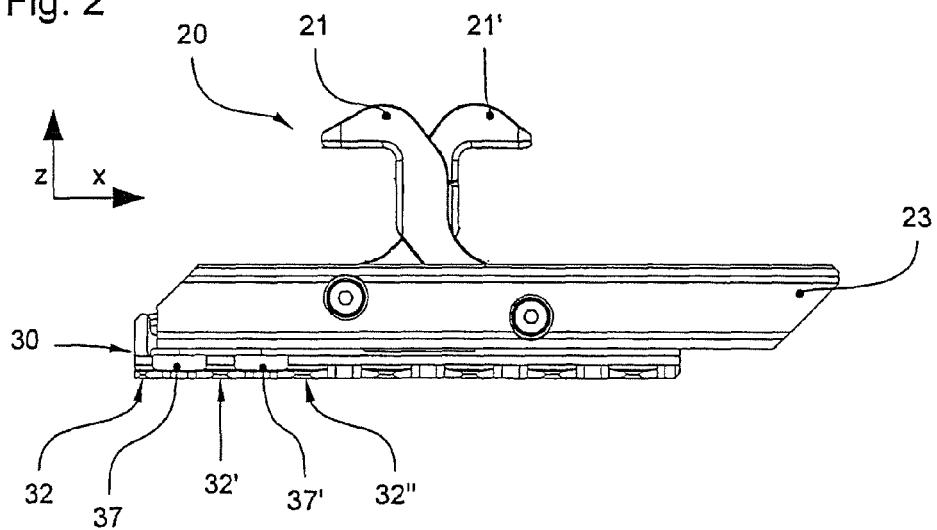
FIG. 2 the locking element of FIG. 1 with fixing rail in a side view.
Figure 3:
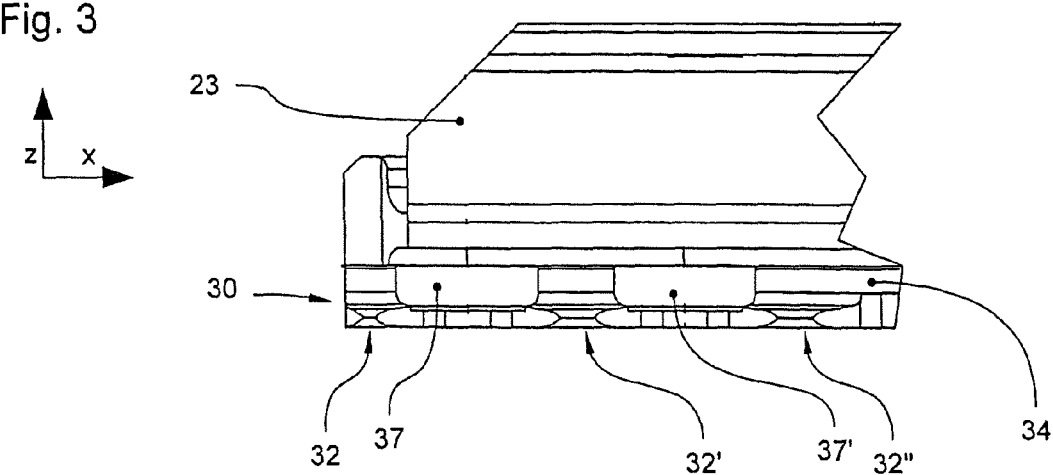
FIG. 3 a detailed view of the fixing rail of the locking element in FIG. 2.
Figure 6:
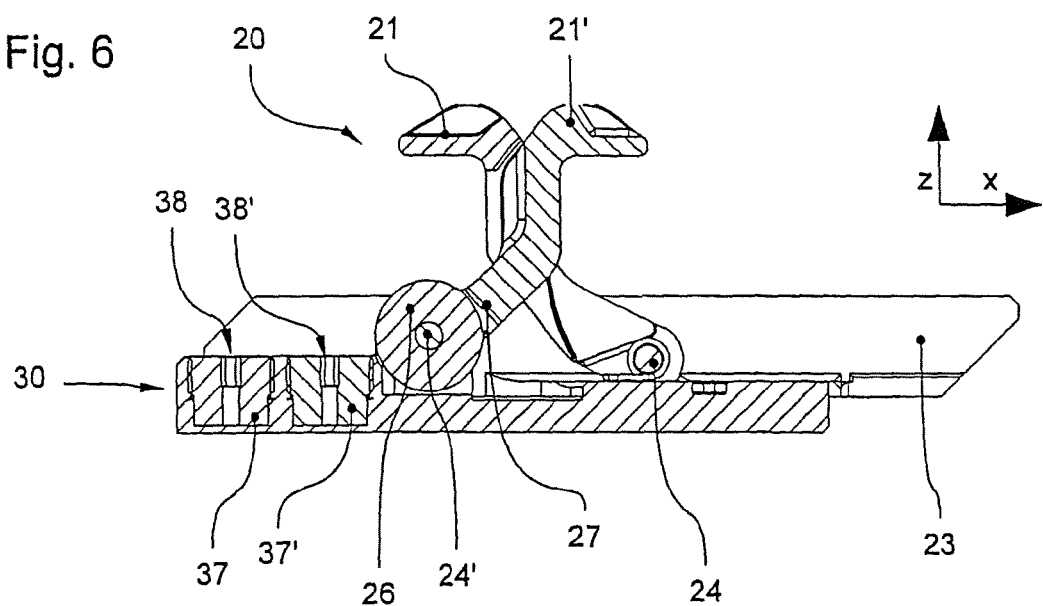
FIG. 6 a longitudinal section through the locking element of FIG. 1 along the x-z plane.

To secure the locking element 20 in the holding position against movement in the x direction, this element comprises a first fixing bolt 37 and a second fixing bolt 37'. As shown in FIGS. 2, 3 and 6, these fixing bolts 37, 37' engage in corresponding threads inside the lock base 23. By rotation of the fixing bolts 37, 37', these can be lowered within the web 34 and unscrewed. FIGS. 2, 3 and 6 show the fixing bolts 37, 37' in lowered position, namely the blocking position. In this blocking position the fixing bolts 37, 37' protrude beyond the web 34 on both sides of the web 34 in the y direction (see FIG. 7) and thus engage in a perforated rail recess 13 such that the fixing rail 30 is fixed in the x direction in the perforated rail 10. To facilitate screwing in and removal of fixing bolts 37, 37', these have hexagonal sockets 38, 38' in which an Allen key can be inserted. A corresponding bore to receive the first fixing bolt 37 is located centrally between the first extension 32 and the second extension 32'. As shown in the bottom view in FIG. 1, this bore partly overlaps with extensions 32, 32'. The diameter of the bores and a fixing bolt diameter $d_{Sch}$ corresponds substantially to the extension diameter $d_{Fort}$ and is substantially greater than the web wall thickness $d_{Steg}$ (see FIG. 7).

The second fixing bolt 37' with corresponding bore is arranged corresponding to the first fixing bolt 37 between the second extension 32' and the third extension 32″.

The fixing bolts 37, 37' are arranged offset to the extensions 32 to 32″ in the x direction such that in the holding position, these coincide with the perforated rail recesses 13. They can thus in the holding position be lowered into the rail 10 or more precisely into the corresponding rail recesses 13 in order to lock the locking element 20 in the perforated rail 10.

As shown from FIGS. 2, 3 and 6, the fixing bolts 37, 37' in the blocking position preferably lie on sections of web 34. Thus these sections of web 34 form a limit for fixing bolts 37, 37' and prevent the fixing bolts 37, 37' from penetrating too deeply.

Figure 4:
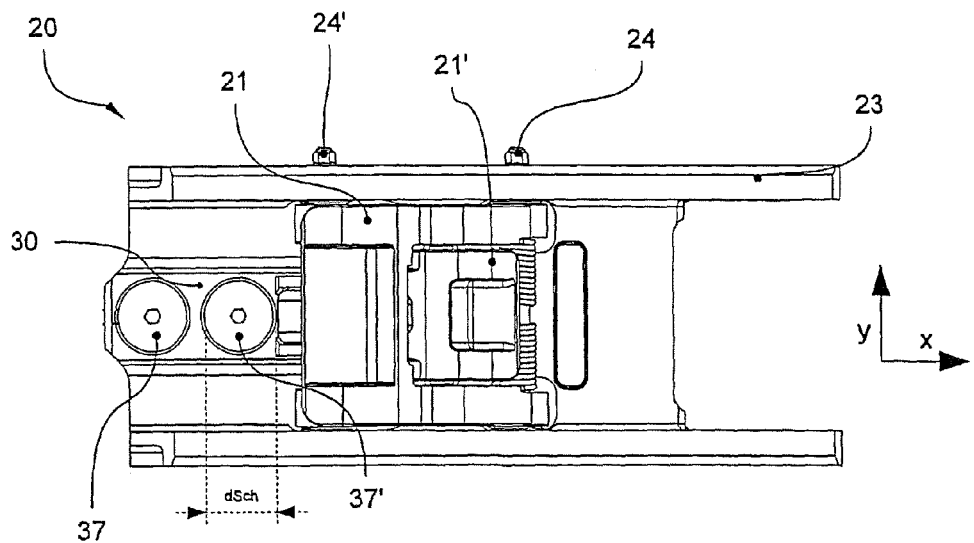
FIG. 4 a top view of the locking element in FIG. 1.

The locking element 20 comprises, as well as the lock base 23, a first locking claw 21 and a second locking claw 21' (see FIGS. 2, 4 and 7) which are intended to hold and secure freight containers. When the cargo area is being loaded, the locking claws 21, 21' can be lowered such that these no longer protrude over the lock base 23. The containers can thus pass over the locking elements 20 unhindered.

The embodiment example of locking element 20 described above has a web 34 and two fixing bolts 37, 37'. The teaching of the invention can also be implemented with just one fixing bolt 37 or a multiplicity of fixing bolts 37, 37'.

According to the embodiment example described, the fixing bolts 37, 37' are positioned between the first and second extensions 32, 32' or the second and third extensions 32', 32″. The fixing bolts 37, 37' can however also be arranged at any other arbitrary point along the fixing rail 30.

A locking element 20 has been described above. The fixing rail 30 according to the invention can also be used however for aircraft seats, roller arrangements and other fixing elements which are anchored in the seat rails.

In the embodiment example described the perforated rail 10 has diameter $d_{Loch}$ and extensions 32 to 32' have extension diameter $d_{Fort}$ of approximately 2 cm. In a further embodiment example, other dimensions can be selected.

As shown in FIG. 6, the first locking claw 21 is mounted rotationally mobile on a first mounting shaft 24 and the second locking claw 21' rotationally mobile on a second mounting shaft 24'. In the position shown in FIG. 6, locking claws 21, 21' cross each other and are thus mutually engaged so as to secure freight. For loading and unloading the freight however the locking claws 21, 21' must be able to be lowered inside the rail base 23 so that freight can pass over them. The second locking claw 21' thus engages in an opening in the first locking claw 21 so that the second locking claw 21' can be lowered by application of a force in the z direction on the head of locking claw 21'. The lowered second locking claw 21' releases the first locking claw so that this can also be lowered, like the second locking claw 21'. In the cross section shown in FIG. 6 therefore both locking claws 21, 21' can be lowered by rotation counter-clockwise. In this lowered state the locking claws 21, 21' lie substantially parallel to each other inside the lock base 23. In a preferred embodiment example the locking element 20 contains spring elements which automatically bring the first locking claw 21 into said lowered position after release by the second locking claw 21'. Further spring elements can be provided to hold the second locking claw 21' in the upright position shown in FIG. 6.

Figure 8:
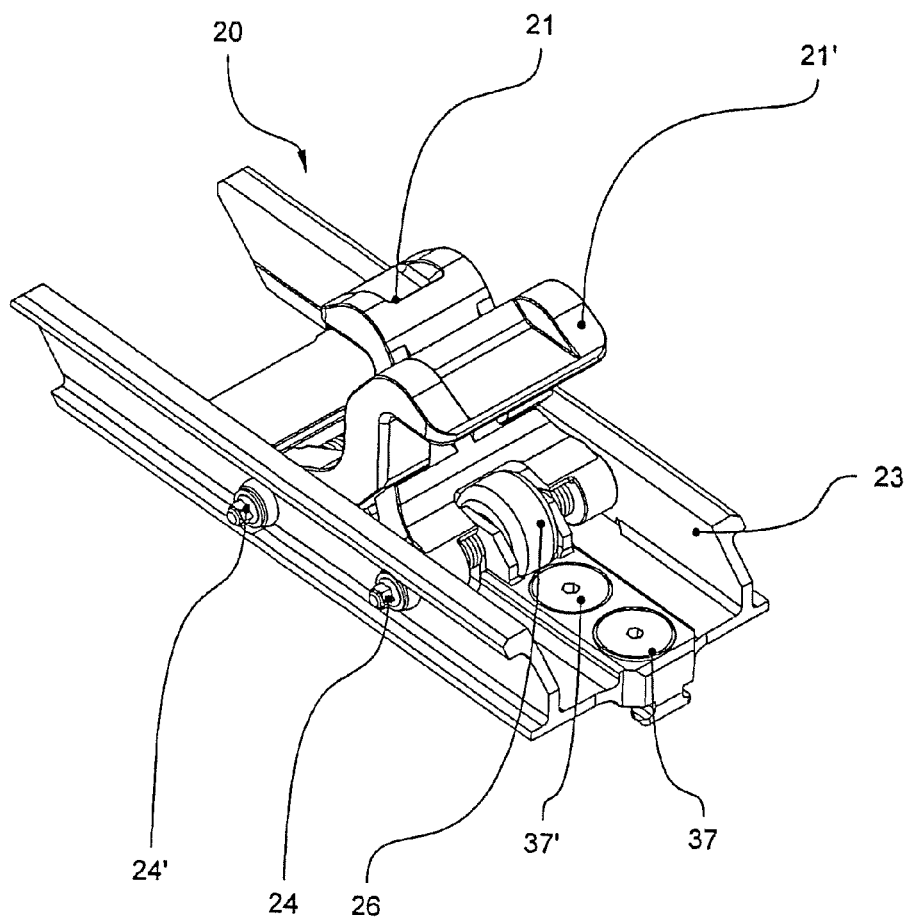
FIG. 8 a perspective view of the locking element in FIG. 1.

In one embodiment example of the present invention, the second locking claw 21' has a ramp 27 which protrudes beyond the lock base 23 and the first locking claw 21 such that on application of a force in the x direction, the second locking claw 21' is swivelled into the lowered position. Preferably here, on unloading freight in particular containers with correspondingly protruding edges, an automatic lowering of locking claws 21, 21' takes place. It is possible for the automatic lowering of the second locking claw 21' to be generated by a container lying directly on the lock base 23. Preferably the locking element 20 as shown in FIGS. 6 and 8 is a transport roller 26 which allows easier movement of the container in the x direction. The transport roller 26 can be formed and arranged such that the containers act with a better lever action on the second locking claw 21', in particular on ramp 27. Preferably the transport roller 26 is mounted on the second mounting shaft 24'.

REFERENCE NUMERAL LIST

10 Perforated rail
11 Protrusion
12 Slot
13 Perforated rail recess
20 Locking element
21, 21' Locking claw
23 Lock base
24, 24' Mounting shaft
26 Transport roller
27 Ramp
30 Fixing rail
32 to 32″ Extension
34 Web
37, 37' Fixing bolt
38, 38' Hexagonal socket
$d_{Loch}$ Hole diameter
$d_{Ver}$ Extension offset
$d_{Steg}$ Web wall thickness
$d_{Fort}$ Extension diameter
$d_{Sch}$ Fixing bolt diameter

The invention claimed is:

1. A function element for fixing in a seat rail of an aircraft, wherein the seat rail has a multiplicity of holes connected together in the x direction by slots and arranged in a grid pattern, comprising:

a fixing rail with a web running in the x direction and a multiplicity of extensions which protrude beyond the web in a y direction on both sides of the web to form a T profile, wherein the fixing rail is formed corresponding to the seat rail such that the fixing rail can be inserted in the seat rail and moved along the x direction into a holding position in which the extensions sit between the holes below the slots, at least one fixing peg which is arranged mobile on the fixing rail and can be brought into a blocking position in which the fixing peg engages in a hole of the seat rail so that the function element is fixed in the x direction, wherein the function element comprises one bore per fixing peg, wherein each bore hosts one fixing peg, partially interrupts the web and extends in a z direction perpendicular to the x direction, and wherein the function element is a locking element with at least one locking claw, wherein the fixing rail includes a section per fixing peg at the bottom of the respective bore wherein the fixing peg lies on the respective section in the blocking position and the respective section forms a limit for preventing further penetration of the fixing peg in the z direction when the fixing peg is in the blocking position, the fixing rail being formed from one piece.

2. The function element according to claim 1, wherein the fixing rail has at least two extensions and at least one fixing peg between the extensions.

3. The function element according to claim 1, wherein the fixing peg is arranged offset to the extensions in the x direction by half a grid interval.

4. The function element according to claim 1, wherein the fixing peg is formed as a threaded bolt.

5. The function element according to claim 1, wherein the function element is formed as an extruded profile from which the extensions are formed separately.

6. The function element according to claim 1, wherein at least one transport roller is mounted on a mounting shaft of the locking claw.

7. An arrangement comprising at least one seat rail having a multiplicity of holes connected by slots; and at least one function element adapted to be selectively fixed to the seat rail, the function element comprising a fixing rail with a web running in the x direction and a multiplicity of extensions which protrude beyond the web in a y direction on both sides of the web to form a T profile, wherein the fixing rail is formed corresponding to the seat rail such that the fixing rail can be inserted in the seat rail and moved along the x direction into a holding position in which the extensions sit between the holes below the slots, at least one fixing peg which is arranged mobile on the fixing rail and can be brought into a blocking position in which the fixing peg engages in a hole of the seat rail so that the function element is fixed in the x direction, wherein the function element comprises one bore per fixing peg, wherein each bore hosts one fixing peg, partially interrupts the web and extends in a z direction perpendicular to the x direction, and wherein the function element is a locking element with at least one locking claw, wherein the fixing rail includes a section per fixing peg at the bottom of the respective bore wherein the fixing peg lies on the respective section in the blocking position and the respective section forms a limit for preventing further penetration of the fixing peg in the z direction when the fixing peg is in the blocking position, the fixing rail being formed from one piece.

8. A function element for fixing in a seat rail of an aircraft, wherein the seat rail has a multiplicity of holes connected together in the x direction by slots and arranged in a grid pattern, comprising:

a fixing rail with a web running in the x direction and a multiplicity of extensions which protrude beyond the web on both sides of the web in a y direction to form a T profile, wherein the fixing rail is formed corresponding to the seat rail such that the fixing rail can be inserted in the seat rail and moved along the x direction into a holding position in which the extensions sit between the holes below the slots, at least one fixing peg which is arranged mobile on the fixing rail and can be brought into a blocking position in which the fixing peg engages in a hole of the seat rail so that the function element is fixed in the x direction, wherein the function element comprises at least one bore per fixing peg, wherein each bore hosts one fixing peg, partially interrupts the web and extends in a z direction perpendicular to the x direction, and wherein the function element is a locking element with at least one locking claw, wherein the fixing rail includes a section per fixing peg at the bottom of the respective bore wherein the fixing peg lies on the respective section in the blocking position and the respective section forms a limit for preventing further penetration of the fixing peg in the bore when the fixing peg is in the blocking position, the fixing rail being formed from one piece.

* * * * *